(12) United States Patent  
Tsang

(10) Patent No.: US 6,818,334 B2  
(45) Date of Patent: Nov. 16, 2004

(54) ACCELERATED HYDROGEN GENERATION THROUGH REACTIVE MIXING OF TWO OR MORE FLUIDS

(75) Inventor: Joseph W. Tsang, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 371 days.

(21) Appl. No.: 10/165,370

(22) Filed: Jun. 6, 2002

(65) Prior Publication Data

US 2003/0228505 A1 Dec. 11, 2003

(51) Int. Cl.[7] .............................................. H01M 8/06
(52) U.S. Cl. ....................................................... 429/17
(58) Field of Search ........................................... 429/17

(56) References Cited

U.S. PATENT DOCUMENTS

| | | | |
|---|---|---|---|
| 5,372,617 A | 12/1994 | Kerrebrock et al. | 48/61 |
| 5,804,329 A | 9/1998 | Amendola | 429/34 |
| 5,948,558 A | 9/1999 | Amendola | 429/50 |
| 6,250,078 B1 | 6/2001 | Amendola et al. | 60/509 |
| 6,316,133 B1 * | 11/2001 | Bossel | 429/17 |
| 6,534,033 B1 * | 3/2003 | Amendola et al. | 423/648.1 |
| 6,737,184 B2 * | 5/2004 | Rusta-Sellehy et al. | 429/17 |
| 2003/0108832 A1 * | 6/2003 | Lumsden et al. | 431/2 |

FOREIGN PATENT DOCUMENTS

| | | | |
|---|---|---|---|
| EP | 1170249 | 1/2002 | |
| EP | 1369947 | * 12/2003 | H01M/8/06 |
| WO | WO01/51410 | 7/2001 | C01B/3/06 |
| WO | WO 01/51410 | * 7/2001 | C01B/3/06 |
| WO | WO0174710 | 10/2001 | |

OTHER PUBLICATIONS

Amendola S c et al: "An ultrasafe hydrogen generator: aqueous, alkaline borohydride solutions and RU catalysts" Journal of Power Sources, Elsevier Sequoia S.A. Lausanne, CH vol. 85, No. 2, Feb. 2000 pp. 186–189, XP004189211.

F. Lowenheim, "Modern Electroplating", John Wiley & Sons 3rd ed., pp. 1–45 and 710–747 (1974).

* cited by examiner

Primary Examiner—Mark Ruthkosky

(57) ABSTRACT

The rate of hydrogen generation in proton-exchange-membrane (PEM) fuel cells is greatly accelerated by mixing a first aqueous alkali borohydride solution with a second aqueous solution in the presence of one or more transition metal catalysts:

$$NaBH_4 + 2H_2O \xrightarrow{metal} 4H_2 + NaBO_2$$

wherein the first solution comprises (a) 5 to 50 wt % $MBH_4$, where M is an alkali metal, (b) 5 to 40 wt % alkali hydroxide or alkaline metal hydroxide, and (c) the balance water, and wherein the second solution comprises (a) 51 to 100% water, and (b) the balance, if any, comprising at least one water-soluble additive.

32 Claims, 2 Drawing Sheets

ACCELERATED HYDROGEN GENERATION THROUGH REACTIVE MIXING OF TWO OR MORE FLUIDS

TECHNICAL FIELD

The present invention relates generally to fuel cells, and, more particularly, to increasing the rate of hydrogen generation to power such fuel cells.

BACKGROUND ART

The fuel cell technology relating to hydrogen-proton exchange membrane ($H_2$-PEM) is of increasing interest as an alternative source of energy. A major concern is the use of pressurized $H_2$ and $O_2$/air containers. $H_2$ is difficult to liquefy, yet the means of generating it only as needed is essential for the efficient working of PEM cells.

While hydrogen gas itself is probably the most efficient source in terms of power generation, there are concerns regarding the handling of hydrogen gas. While many of these concerns may not be wholly justified, nevertheless, alternative fuel sources must be found that will allay most, if not all, of such concerns.

In the PEM cells, the cathode is typically Pt and the anode is also Pt. The proton exchange membrane is located between the two electrodes. On the surface of the Pt anode, one mole of hydrogen generates two moles of proton ions ($H^+$) and 2 moles of electrons.

One promising fuel source of hydrogen is sodium borohydride ($NaBH_4$); see, e.g., S. Amendola et al, "System for Hydrogen Generation", PCT WO 01/51410, Jul. 19, 2001. This reference discloses the generation of hydrogen for, e.g., fuel cell applications, using $NaBH_4$. This compound offers the best source of hydrogen, except for hydrogen gas, over other compounds under consideration, such as methanol. Methanol is used in the so-called direct methanol fuel cell (DMFC), a variant of the hydrogen PEM fuel cell. Typically, aqueous methanol, approximately 3 wt %, is used as the fuel. From an energy standpoint, the DMFC provides less power than the hydrogen PEM fuel cell.

There are two outstanding issues with the $NaBH_4$ solution: stability and reactivity. Since $NaBH_4$ hydrolyzes slowly in water, the solution stability is obtained by reducing the reaction rate in an alkaline condition. Several commercially available $NaBH_4$ solutions containing a high concentration of sodium hydroxide have demonstrated excellent stability in long-term storage. These solutions, however, are not sufficiently reactive to carry out the reaction at room temperature as described in Eqn. 1, even in the presence of a metal catalyst:

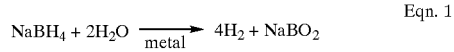

$$NaBH_4 + 2H_2O \xrightarrow{metal} 4H_2 + NaBO_2 \qquad \text{Eqn. 1}$$

Therefore, these stable solutions are not suitable for fuel cell applications, where the operating temperature is near ambient temperature. By lowering the strong base concentration, i.e., to 10 wt %, the solutions are very reactive in the presence of a catalyst at ambient temperature, but these solutions lack the stability in long term storage. Over time, both the gradual loss of sodium borohydride and pressure build-up due to $H_2$ present problems in shelf life and packaging. Clearly, there is a delicate balance between solution stability and reactivity from a formulation perspective using the borohydride solution.

Thus, what is needed is a borohydride solution that evidences long term stability and high reactivity.

DISCLOSURE OF INVENTION

In accordance with the embodiments disclosed herein, a proton-exchange-membrane fuel cell is provided with a source of hydrogen gas from a reaction chamber, wherein a mechanism is provided for introducing first and second solutions into the reaction chamber to decompose $NaBH_4$ in the presence of a catalyst to generate hydrogen. The first solution comprises (a) 5 to 50 wt % $MBH_4$, where M is an alkali metal, (b) 5 to 40 wt % alkali hydroxide or alkaline metal hydroxide, and (c) the balance water, and the second solution comprises (a) 51 to 100% water, and (b) the balance, if any, comprising at least one water-soluble component.

Also in accordance with additional embodiments disclosed herein, a method of operating the proton-exchange-member fuel cell is provided. The method comprises introducing the first and second solutions into the reaction chamber to form the mixture.

The approach taken herein of mixing two aqueous solutions in the presence of a catalyst solves the stability and reactivity issues of aqueous alkali borohydride solution simultaneously. Further, the approach taken herein of reactive mixing enables one to optimize for the variables in two opposing considerations—stability versus reactivity. The alkali borohydride solution can be formulated to provide high specific energy as well as excellent long term stability. Upon mixing with a second aqueous solution, the borohydride solution becomes "reactive" and provides an accelerated reaction rate and high percent conversion toward hydrogen evolution.

BEST MODES FOR CARRYING OUT THE INVENTION

Figure 1:
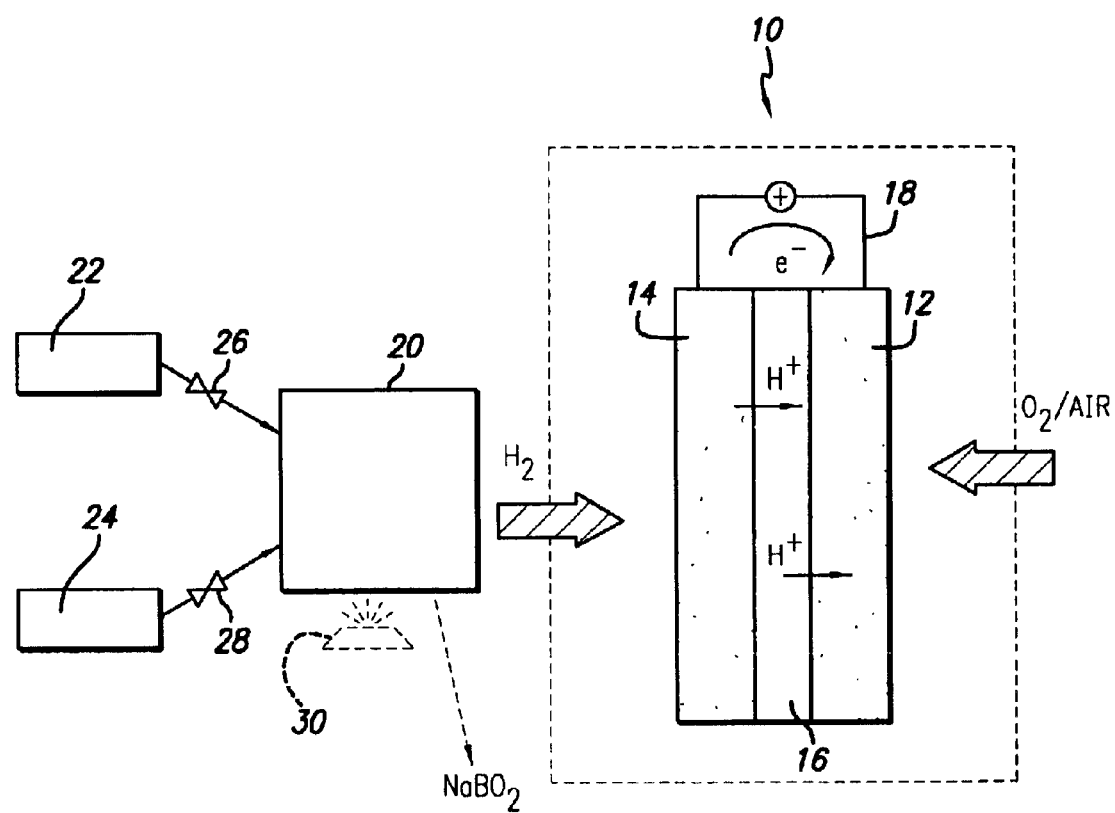
FIG. 1 is a schematic diagram, depicting one embodiment of mixing two solutions to generate hydrogen for a PEM fuel cell.

As is well known, hydrogen can be derived from the hydrolysis reaction of sodium borohydride in water. At room temperature, the rate of hydrolysis is slow, and it accelerates at higher temperature. By the use of one or more transition metals as a catalyst, the activation energy is lowered such that the reaction takes place at room temperature instead and also at a significantly higher turnover rate as described in the equation below.

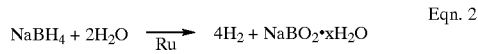

$$NaBH_4 + 2H_2O \xrightarrow{Ru} 4H_2 + NaBO_2 \cdot xH_2O \qquad \text{Eqn. 2}$$

Ruthenium is shown above as the catalyst for the reaction. However, in practice, one or more transition metals may be used and are selected from Groups IB to VIII of the Periodic Table (Groups IB, IIB, IIIB, IVB, VB, VIB, VIIB, and VIII). Examples include ruthenium, osmium, and platinum. In addition to hydrogen, sodium meta-borate, $NaBO_2$, is formed from the reaction as a by-product. The meta-borate tends to precipitate from the solution as a solid at higher concentrations.

The catalyst is distributed onto a support matrix that has a large surface area. The catalyst as such is termed a "supported catalyst". Several methods have been described in the technical literature. With external supplied power, metal from an ionic bath is deposited by electroplating onto conductive matrices, such as metal screens, metal filters, metal sponges, conductive polymers, carbon cloths, and other graphitized articles. With properly catalyzed non-conductive substrates such as glass and plastic, electroless plating is suitable where the metal is deposited with an added chemical reducing agent in the ionic bath; see, e.g., "Fundamental Principles", pp. 1–45, and "Electroless Plating", pp. 710–747, both in *Modern Electroplating*, F. Lowenheim, 3$^{rd}$ Ed., John Wiley & Sons, New York (1974). Semiconductor processes can also be used here. Using either AC, DC, or RF as the power source, metal is deposited by sputtering onto the substrate. Direct chemical deposition under reduced pressure can also be used.

By metering sodium borohydride solution over a catalyst, the amount of hydrogen can be accurately delivered to a polymer electrolyte membrane (PEM) fuel cell. Since $NaBH_4$ hydrolyzes slowly in water, the solution stability is obtained in an alkaline condition where it reduces the rate of reaction. Several commercially available $NaBH_4$ solutions containing high concentration of sodium hydroxide have demonstrated excellent stability in long-term storage. These solutions, however, are not sufficiently reactive to carry out the reaction at room temperature as described in Eqn. 1, even in the presence of a metal catalyst. Therefore, these stable solutions are not suitable for fuel cell applications, where the operating temperature is near ambient temperature. By lowering the strong base concentration, i.e., to 10 wt %, the solutions are very reactive in the presence of a catalyst at ambient temperature, but these solutions lack the stability in long term storage. Over time, both the gradual loss of sodium borohydride and pressure build-up due to $H_2$ present problems in shelf life and packaging. Clearly, there is a delicate balance between stability and reactivity from formulation perspective with the borohydride solution.

In accordance with the various embodiments disclosed herein, a method is provided for attaining both stability as well as reactivity of the aqueous $NaBH_4$ solution. The method involves the mixing of more than one solution at which the final concentration of $NaBH_4$ and $H_2O$ falls within the "reactive" composition range that readily decomposes and generates hydrogen in the presence of a catalyst. Preferably, the molar ratio of $NaBH_4:H_2O$ should be at least 5:1 In addition, the reaction rate is vastly accelerated over either solution if used alone, and the percent conversion of $NaBH_4$ to hydrogen gas is improved.

In the practice of the various embodiments, two solutions are preferably used. Solution A contains a high concentration of $NaBH_4$ and NaOH, and thus exhibits good long-term stability. The shelf life is expected to exceed 6 to 12 months with no change of sodium borohydride concentration. At concentrations of above 20 wt % $NaBH_4$, Solution A has a hydrogen content equal to 6 wt % and a specific energy in excess of 2,000 watt-hr/kg of solution. For comparison purposes, compressed hydrogen in a cylinder contains less than 1 wt % hydrogen.

Solution A comprises about 5 to 50 wt % $NaBH_4$, 5 to 40 wt % alkali hydroxide or alkaline metal hydroxide, e.g., NaOH, KOH, LiOH, $Ca(OH)_2$, $Mg(OH)_2$, and the balance water.

In contrast to Solution A, Solution B contains a majority of water in addition to an optional water-soluble additive comprising one or more of the following components: (1) alcohols of $C_1$–$C_{10}$, (2) ethylene glycol and higher homologs, (3) diols and triols of $C_3$ to $C_{20}$, (4) non-ionic surfactants such as TERGITOLs, SURFYNOLs, PLURONICs, and BRIJs, (5) mineral acids, and (6) alkyl and aryl carboxylic acids, alkyl and aryl sulfonic acids, alkyl and aryl phosphoric acids, and alpha-hydroxy acids.

TERGITOL surfactants are secondary alcohol ethoxylates, e.g., polyethylene or polypropylene oxide ethers, available from Union Carbide.

SURFYNOL surfactants are acetylenic polyethylene oxides, available from Air Products & Chemicals, Inc. PLURONIC surfactants are polyethylene oxide block copolymers, available from BASF. BRIJ surfactants are polyethylene oxide ethers, available from ICI Surfactants. The TERGITOLs, SURFYNOLs, PLURONICs, and BRIJs are more fully disclosed in U.S. Pat. No. 5,106,416.

The concentration of water in Solution B ranges from 51 to 100 wt %, the balance (49 to 0 wt %) comprising the water-soluble additive. The purpose of the additive is to increase the reaction rate. However, the reaction rate may also be increased by reducing the solution pH. In this connection, the pH of Solution B is preferably within the range of about –2 to 7.

The final concentration is achieved by simply mixing Solutions A and B. The final solution should have a concentration of at least 5 wt % $NaBH_4$, and preferably at least 15 wt %, but from an energy perspective, it is desired to use as high a concentration as possible, noting that the maximum solubility of $NaBH_4$ in water at room temperature is about 55 wt %.

The best mode to practice the embodiments disclosed herein is to meter the $NaBH_4$ solution (Solution A) and the second aqueous solution (Solution B) independently by two separate mechanical devices, i.e., pumps, into a chamber that contains the catalyst. The pump rates are selected such that the molar concentrations of $NaBH_4$ and the second aqueous solution constitute a ratio of $H_2O$ to $NaBH_4$ of at least 5:1, preferably at a ratio in the range of 6:1 to 30:1. To further accelerate the reaction rate, the reaction chamber may also be heated externally by a capacitor or other electronic device.

FIG. 1 depicts schematically a PEM fuel cell 10 employing the teachings herein. The fuel cell 10 comprises a cathode 12, an anode 14, and the proton exchange membrane 16. The circuit between the cathode 12 and anode 14 is completed with connection 18. During operation, protons $H^+$ flow from the anode 14 to the cathode 12 through the proton exchange membrane 16, while electrons $e^-$ flow from the anode 14 to the cathode 12 through the connection 18.

Oxygen and/or air is introduced to the cathode 12, while hydrogen gas is introduced to the anode 14. Hydrogen gas is generated in a reaction chamber 20, using a catalyst (not shown). In the reaction chamber, aqueous sodium borohydride, exposed to the catalyst, generates hydrogen gas and sodium borate, as described above. Hydrogen from the reaction chamber 20 is then introduced into the PEM fuel cell 10.

In accordance with the teachings herein, Solution A, comprising sodium borohydride in water, and Solution B, comprising water, and the optional water-soluble additive, are combined in the reaction chamber 20. Solution A is contained in reservoir 22, while Solution B is contained in reservoir 24. A metering pump/valve 26 meters out the desired volume of Solution A into the reaction chamber 20, while metering pump/valve 28 meters out the desired volume of Solution B into the reaction chamber. Thus, Solutions A and B are metered separately from separate reservoirs 22, 24 and mixed within the reaction chamber 20.

In another embodiment, the reaction chamber is heated, using an external heating mechanism 30, to increase the reaction rate of the Solutions A and B in the presence of the catalyst. The temperature to which the reaction chamber is heated is advantageously less than the boiling points of the two solutions.

While the borohydride has been described above in terms of sodium borohydride, thus using sodium as the cation, other cations may also be used in the practice of the various embodiments. Examples of such other cations include the Group IA elements listed in the Periodic Table, known as the alkali metals, including, but not limited to, lithium and potassium.

EXAMPLES

In experiments, it was found that the addition of the second aqueous solution (Solution B) to an otherwise stable $NaBH_4$ solution (Solution A) greatly accelerated the kinetics of hydrogen evolution and the percent conversion. An example of a stable solution (Solution A) is denoted as a "30/15 solution". It comprised 30 wt % $NaBH_4$, 15 wt % NaOH, and 65 wt % water. This solution has a stability in excess of 10 months under accelerated storage conditions. When this solution was mixed with ruthenium as the catalyst at 25° C. and 60° C., the reaction rates were 1.8 and 21.1 mL/minute, respectively, as shown in Table I below. About 0.15 wt % Ru was used as the catalyst with respect to the total weight of Solutions A and B. The Ru catalyst was prepared by chemical deposition of Ru onto a support matrix that had a high surface area (an ion exchange resin). Also shown in Table I is the result where the pH of Solution B was reduced with the addition of either a weak acid (acetic or citric acid) or a strong acid (hydrochloric acid). The pH of the weak acids is approximately 1 to 2, while the pH of the strong acid is in the negative region.

TABLE I

Reaction Rates of Hydrogen Generation from $NaBH_4$ Solutions.

| Solutions* | Rate at 25° C. (mL/min) | Rate at 60° C. (mL/min) |
|---|---|---|
| 30/15 (Solution A) | 1.8 | 21.1 |
| 30/15 + Solution B1 | 20.2 | 55.0 |
| 30/15 + Solution B2 | 12.1 | 52.5 |
| 30/15 + Solution B3 | 9.7 | 27.0 |
| 30/15 + Solution B4 | 13.2 | 89.6 |
| 30/15 + Solution B5 | 26.2 | 152.5 |
| 30/15 + Solution B6 | 29 | 99 |
| 30/15 + Solution B7 | 30 | 120 |
| 30/15 + Solution B8 | 34 | 128 |

*Notes:
Solution B1 = 50 wt % ethylene glycol, 50 wt % $H_2O$
Solution B2 = 50 wt % 1,5-pentanediol, 50 wt % $H_2O$
Solution B3 = 25 wt % TERGITOL 15-S-9, 75 wt % $H_2O$
Solution B4 = 50 wt % methanol, 50 wt % $H_2O$
Solution B5 = $H_2O$
Solution B6 = 0.1 M acetic acid, pH = 2.37
Solution B7 = 0.1 M citric acid, pH = 1.56
Solution B8 = 0.1 M hydrochloric acid, pH = 0.99.

Figure 2:
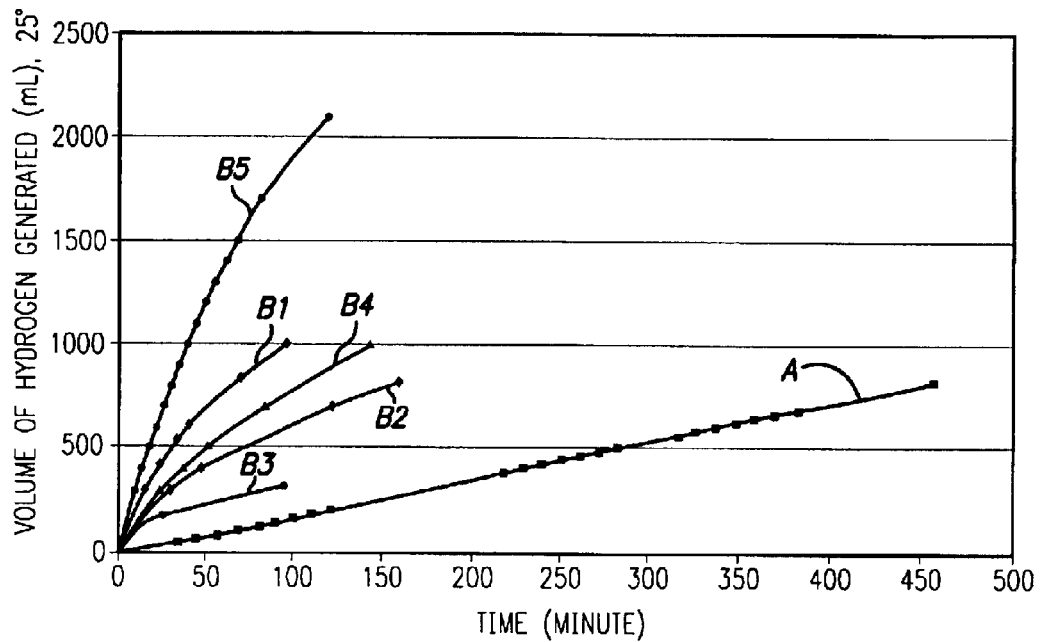
FIG. 2 on coordinates of hydrogen volume (in mL) and time (in minutes), is a plot of the volume of hydrogen generated as a function of time for various solutions at 25° C.
Figure 3:
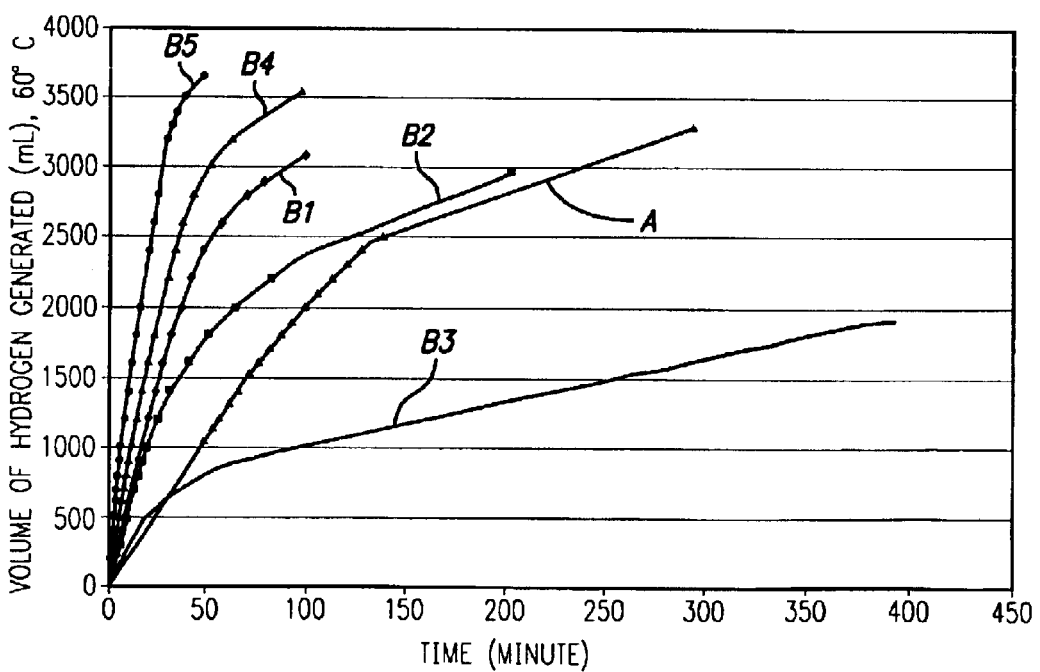
FIG. 3 similar to that as FIG. 2, but at 60° C.

When the second aqueous solution (Solutions B1–B5) was added to the 30/15 solution (Solution A), the total volume of $H_2$ generated as a function of time increased significantly. This was observed at both 25° C. and 60° C. as shown in FIGS. 2 and 3. As a zero order reaction, the reaction rate is obtained from the linear portion of the curve. At 25° C., the reaction rates increased about 5 to 11 fold from 1.8 mL/min to 10 to 20 mL/min upon the addition of the aqueous mixture of ethylene glycol (Solution B1), 1,5-pentanediol (Solution B2), TERGITOL 15-S-9 (Solution B3), or methanol (Solution B4). With the addition of water alone (Solution B5), the rate increased 15 fold to 26.2 mL/min.

In FIG. 3, a similar trend is also observed when the reaction was carried out at elevated temperature. At 60° C., the reaction rates increased about 2 to 4 fold with added ethylene glycol (Solution B1), 1,5-pentanediol (Solution B2), or methanol (Solution B4), while the addition of water alone (Solution B5) provided the largest increase, 7 fold. However, the added surfactant, TERGITOL 15-S-9 (Solution B3) showed little beneficial effect at 60° C. In this case, the catalyst rose to the surface from the excessive foaming, preventing reaction with the bulk $NaBH_4$ solution.

An additional benefit to the reactive mixing method disclosed herein is the total yield of hydrogen per unit volume or weight of $NaBH_4$ solution. It is highly desirable to achieve complete conversion in order to maximize the fuel efficiency in a PEM fuel cell system. It was found that the addition of a second solution provided a higher volume of hydrogen as shown in Table II below. The extent of hydrolysis according to Eqn. 1 is shown in Table II below at both temperatures. The addition of water (Solution B5) in particular increased the volume of hydrogen at both 25° C. and 60° C.

TABLE II

Volume of Hydrogen Generated and % Conversion.

| Solutions | $H_2$ generated at 25° C. (mL) | % conversion at 25° C. | $H_2$ generated at 60° C. (mL) | % conversion at 60° C. |
|---|---|---|---|---|
| 30/15 (Solution A) | 820 | 21% | 3,280 | 84% |
| 30/15 + Solution B1 | 1,000 | 26% | 3,080 | 79% |
| 30/15 + Solution B2 | 860 | 22% | 2,960 | 76% |
| 30/15 + Solution B3 | 320 | 8% | 2,000 | 51% |
| 30/15 + Solution B4 | 1,040 | 27% | 3,540 | 91% |
| 30/15 + Solution B5 | 2,100 | 54% | 3,640 | 94% |
| 30/15 + Solution B6 | 2,200 | 57% | 3,690 | 95% |
| 30/15 + Solution B7 | 2,480 | 64% | 3,750 | 96% |
| 30/15 + Solution B8 | 2,670 | 69% | 3,820 | 98% |

Since the decomposition of sodium borohydride is pH-dependent, the reaction rate is enhanced by the addition of an acid, either organic or mineral acid, in Solutions B6–B8 at 25° C. and 60° C. In addition, the acid strength of the acid used also influenced the reaction rate. Strong acids, such as hydrochloric acid, completely dissociated in water, while partial dissociation of $H^+$ was obtained in weak acids, such as acetic acid and citric acid ($K_a = 1.75 \times 10^{-5}$ for acetic acid).

It was found that the key to the increasing both the reaction rate and the percent conversion of $NaBH_4$ is the amount of water available. Since the by-product from the reaction, meta-borate, exists in more than one form of hydrate, such as pentahydrate, octahydrate, and decahydrate (number of water molecules for each $NaBO_2$ molecule as adducts), then more water molecules are chelated to meta-borate as the reaction proceeds and therefore are not available for the hydrolysis reaction. The addition of the second aqueous solution alleviates this limiting factor, and enables the reaction to proceed toward complete hydrolysis of $NaBH_4$.

In Table III below, the relationship between the molar concentrations of $H_2O/NaBH_4$ and the reactivity of $NaBH_4$ solution (the reaction rate and percent conversion) is demonstrated. Since alcohol reacts with $NaBH_4$ to provide hydrogen, then hydroxyl-containing compounds are included as part of the calculation for the molar concentration of water. At higher molar concentrations of $H_2O$ relative to $NaBH_4$, the reaction rate as well as the percent conversion were considerably higher than that of "30/15" solution (Solution A). This trend also held at the elevated temperature of 60° C. With added water alone (Solution B5), the molar concentration of water relative to $NaBH_4$ was the highest in this study. The rate of hydrolysis and percent conversion was 15 and 2.6 fold, respectively, that of "30/15" solution.

TABLE III

Molar Concentrations of Reactants and Reactions Rates.

| Solutions | $NaBH_4$ (M) | $H_2O$* (M) | $H_2O$: $NaBH_4$ | Rate at 25° C. (mL/min) |
| --- | --- | --- | --- | --- |
| 30/15 (Solution A) | 8.7 | 33.6 | 3.8 | 1.8 |
| 30/15 + Solution B1 | 6.2 | 37.7 | 6.1 | 20.2 |
| 30/15 + Solution B2 | 6.2 | 35.7 | 5.5 | 12.1 |
| 30/15 + Solution B3 | 6.2 | 37.2 | 6.0 | 9.7 |
| 30/15 + Solution B4 | 6.2 | 37.6 | 6.0 | 13.2 |
| 30/15 + Solution B5 | 6.2 | 41.4 | 6.6 | 26.2 |

*Note:
Also includes hydroxyl-containing compounds.

Industrial Applicability

The combination of an aqueous borohydride solution, which is stable during storage, and another aqueous solution, which promotes increased hydrogen formation, is expected to find use in, for example, fuel cells.

What is claimed is:

1. A proton-exchange-membrane fuel cell comprising a cathode, an anode, and a proton-exchange-membrane disposed therebetween and a reaction chamber for generating hydrogen gas employing a catalyst, said hydrogen gas being delivered to said anode, wherein a mechanism is provided for introducing a first solution and a second solution into said reaction chamber to form a mixture, said first solution comprising (a) 5 to 50 wt % $MBH_4$, where M is an alkali metal, (b) 5 to 40 wt % alkali hydroxide or alkaline metal hydroxide, and (c) the balance water, and said second solution comprising (a) 51 to 100% water, and (b) the balance, if any, comprising at least one water-soluble additive.

2. The fuel cell of claim 1 wherein M is selected from the group consisting of sodium, potassium, and lithium.

3. The fuel cell of claim 1 wherein said alkali hydroxide is selected from the group consisting of NaOH, KOH, and LiOH.

4. The fuel cell of claim 1 wherein said alkaline metal hydroxide is selected from the group consisting of $Ca(OH)_2$ and $Mg(OH)_2$.

5. The fuel cell of claim 1 wherein said second solution has a pH that is within a range of about −2 to 7.

6. The fuel cell of claim 1 wherein said catalyst comprises at least one transition metal selected from the group consisting of Groups IB to VIII of the Periodic Table.

7. The fuel cell of claim 6 wherein said transition metal is selected from the group consisting of ruthenium, osmium, and platinum.

8. The fuel cell of claim 1 wherein in said reaction chamber, said mixture has a molar ratio of within a ratio of 5:1 to 50:1 of water:$MBH_4$.

9. The fuel cell of claim 1 wherein said at least one water-soluble additive is selected from the group consisting of: (1) alcohols of $C_1$–$C_{10}$, (2) ethylene glycol and higher homologs, (3) diols and triols of $C_3$ to $C_{20}$, (4) non-ionic surfactants, (5) mineral acids, and (6) alkyl and aryl carboxylic acids, alkyl and aryl sulfonic acids, alkyl and aryl phosphoric acids, and alpha-hydroxy acids.

10. The fuel cell of claim 9 wherein said non-ionic surfactants are selected from the group consisting of secondary alcohol ethoxylates, acetylenic polyethylene oxides, polyethylene oxide block copolymers, polyethylene oxide ethers.

11. The fuel cell of claim 1 wherein said reaction chamber is provided with a heating mechanism to heat said reaction chamber to a temperature less than the boiling points of said first solution and said second solution.

12. A proton-exchange-membrane fuel cell comprising a cathode, an anode, and a proton-exchange-membrane disposed therebetween and a reaction chamber for generating hydrogen gas employing a catalyst, said hydrogen gas being delivered to said anode, wherein a mechanism is provided for introducing a first solution and a second solution into said reaction chamber to form a mixture, said first solution comprising (a) 15 to 50 wt % $NaBH_4$, (b) 5 to 40 wt % sodium hydroxide, and (c) the balance water, and said second solution comprising (a) 51 to 100% water, and (b) the balance, if any, comprising at least one water-soluble additive.

13. The fuel cell of claim 12 wherein said second solution has a pH that is within a range of about −2 to 7.

14. The fuel cell of claim 12 wherein said catalyst comprises at least one transition metal selected from the group consisting of Groups IB to VIII of the Periodic Table.

15. The fuel cell of claim 14 wherein said transition metal is selected from the group consisting of ruthenium, osmium, and platinum.

16. The fuel cell of claim 12 wherein in said reaction chamber, said mixture has a molar ratio of within a ratio of 5:1 to 50:1 of water:$NaBH_4$.

17. The fuel cell of claim 12 wherein said at least one water-soluble additive is selected from the group consisting of: (1) alcohols of $C_1$–$C_{10}$, (2) ethylene glycol and higher homologs, (3) diols and triols of $C_3$ to $C_{20}$, (4) non-ionic surfactants, (5) mineral acids, and (6) alkyl and aryl carboxylic acids, alkyl and aryl sulfonic acids, alkyl and aryl phosphoric acids, and alpha-hydroxy acids.

18. The fuel cell of claim 17 wherein said non-ionic surfactants are selected from the group consisting of secondary alcohol ethoxylates, acetylenic polyethylene oxides, polyethylene oxide block copolymers, polyethylene oxide ethers.

19. The fuel cell of claim 12 wherein said reaction chamber is provided with a heating mechanism to a temperature less than the boiling points of said first solution and said second solution.

20. A method of operating a proton-exchange-member fuel cell comprising a cathode, an anode, and a proton-exchange-membrane disposed therebetween, wherein said fuel cell is supplied with hydrogen gas from a reaction chamber that generates said hydrogen gas employing a catalyst, said hydrogen gas being delivered to said anode, said method comprising: introducing a first solution and a second solution into said reaction chamber to form a mixture, said first solution comprising (a) 5 to 50 wt % $MBH_4$, where M is an alkali metal, (b) 5 to 40 wt % alkali hydroxide or alkaline metal hydroxide, and (c) the balance water, and said second solution comprising (a) 51 to 100% water, and (b) the balance, if any, comprising at least one water-soluble additive.

21. The method of claim 20 wherein M is selected from the group consisting of sodium, potassium, and lithium.

22. The method of claim 20 wherein said alkali hydroxide is selected from the group consisting of NaOH, KOH, and LiOH.

23. The method of claim 20 wherein said alkaline metal hydroxide is selected from the group consisting of $Ca(OH)_2$ and $Mg(OH)_2$.

24. The method of claim 20 wherein said second solution has a pH that is within a range of about −2 to 7.

25. The method of claim 20 wherein said catalyst comprises at least one transition metal selected from the group consisting of Groups 1B to VII of the Periodic Table.

26. The method of claim 25 wherein said transition metal is selected from the group consisting of ruthenium, osmium, and platinum.

27. The method of claim 20 wherein in said reaction chamber, said mixture has a molar ratio of within a ratio of 5:1 to 50:1 of water:$MBH_4$.

28. The method of claim 20 wherein said at least one water-soluble additive is selected from the group consisting of: (1) alcohols of $C_1$–$C_{10}$, (2) ethylene glycol and higher homologs, (3) diols and triols of $C_3$ to $C_{20}$, (4) non-ionic surfactants, (5) mineral acids, and (6) alkyl and aryl carboxylic acids, alkyl and aryl sulfonic acids, alkyl and aryl phosphoric acids, and alpha-hydroxy acids.

29. The method of claim 28 wherein said non-ionic surfactants are selected from the group consisting of secondary alcohol ethoxylates, acetylenic polyethylene oxides, polyethylene oxide block copolymers, polyethylene oxide ethers.

30. The method of claim 20 wherein said first solution and said second solution are metered separately from separate reservoirs and mixed within said reaction chamber.

31. The method of claim 20 wherein said reaction chamber is heated to increase reaction rate of said first solution and said second solution in the presence of said catalyst.

32. The method of claim 31 wherein said reaction chamber is heated to a temperature less than the boiling points of said first solution and said second solution.

* * * * *